(12) United States Patent
Schonberger

(10) Patent No.: US 8,567,589 B2
(45) Date of Patent: Oct. 29, 2013

(54) BLOW MOLDING MACHINE FOR CONTAINERS AND MANDREL HOLDER

(75) Inventor: Wolfgang Schonberger, Brennberg (DE)

(73) Assignee: Krones AG, Neutraubling (DE)

( * ) Notice: Subject to any disclaimer, the term of this patent is extended or adjusted under 35 U.S.C. 154(b) by 597 days.

(21) Appl. No.: 12/672,554

(22) PCT Filed: Jul. 30, 2008

(86) PCT No.: PCT/EP2008/006282
§ 371 (c)(1),
(2), (4) Date: Jan. 11, 2011

(87) PCT Pub. No.: WO2009/018952
PCT Pub. Date: Feb. 12, 2009

(65) Prior Publication Data
US 2011/0120840 A1     May 26, 2011

(30) Foreign Application Priority Data

Aug. 8, 2007 (DE) .......................... 10 2007 037 400

(51) Int. Cl.
| | |
|---|---|
| B29C 49/42 | (2006.01) |
| B65G 17/20 | (2006.01) |
| B65G 17/32 | (2006.01) |
| B65G 47/86 | (2006.01) |
| B29C 49/48 | (2006.01) |

(52) U.S. Cl.
CPC .......... B29C 49/4205 (2013.01); B65G 47/842 (2013.01); *B29C 2049/4856* (2013.01)
USPC ................ 198/465.4; 198/470.1; 198/867.02; 198/867.09; 198/803.12

(58) Field of Classification Search
USPC ............... 198/867.09, 803.12, 867.02, 470.1, 198/465.4; 269/48.1, 48.2
See application file for complete search history.

(56) References Cited

U.S. PATENT DOCUMENTS 3,339,230 A    9/1967 Farrell
3,927,760 A * 12/1975 McCall ...................... 198/687.1
(Continued)

FOREIGN PATENT DOCUMENTS

| CN | 1498188 A | 5/2004 |
|---|---|---|
| DE | 2538169 A1 | 3/1977 |

(Continued)

OTHER PUBLICATIONS

Chinese Office Action for 200880102439.8, dated Jul. 13, 2012.

(Continued)

*Primary Examiner* — Mark A Deuble
(74) *Attorney, Agent, or Firm* — Marshall, Gerstein & Borun LLP

(57) ABSTRACT

A blow molding machine for containers, having a conveyor path carrying a mandrel holder and pre-forming mandrels attached to the mandrel holders in an exchangeable manner by means of removable couplings, wherein each coupling has a mandrel clamping mechanism and a releasing element accessible form outside that can be adjusted at least relative to the mandrel holder for releasing the clamping mechanism. In the mandrel holder, particularly for use in a blow molding machine, the mandrel clamping mechanism is designed with a ball joint lock, and the ball joint lock can be released by means of a releasing element in order to exchange a performing mandrel.

16 Claims, 3 Drawing Sheets

(56) References Cited

U.S. PATENT DOCUMENTS

| | | | |
|---|---|---|---|
| 4,456,447 A * | 6/1984 | Smith | 425/182 |
| 4,572,355 A * | 2/1986 | Hunter | 198/803.12 |
| 4,745,674 A | 5/1988 | Abe et al. | |
| 5,232,717 A * | 8/1993 | Voss | 425/534 |
| 6,669,010 B1 * | 12/2003 | Venturato et al. | 198/867.09 |
| 7,008,215 B2 * | 3/2006 | Goss | 425/534 |

FOREIGN PATENT DOCUMENTS

| | | |
|---|---|---|
| DE | 3527105 A1 | 2/1986 |
| DE | 20302387 U1 | 4/2003 |
| EP | 1743733 A1 | 1/2007 |
| JP | 60071149 A | 4/1985 |
| JP | 61063438 A | 4/1986 |
| JP | 7032458 A | 2/1995 |
| WO | WO-02064295 A2 | 8/2002 |
| WO | WO-02068300 A1 | 9/2002 |

OTHER PUBLICATIONS

Notification of the Second Office Action to the corresponding application No. 200880102439.8, dated Mar. 18, 2013.

* cited by examiner

BLOW MOLDING MACHINE FOR CONTAINERS AND MANDREL HOLDER

CROSS-REFERENCE TO RELATED APPLICATION

The present application claims the benefit of priority of International Patent Application No. PCT/EP2008/006282, filed Jul. 20, 2008, which application claims priority of European Patent Application No. 102007037400.5, filed Aug. 8, 2007. The entire text of the priority application is incorporated herein by reference in its entirety.

FIELD OF THE DISCLOSURE

The disclosure relates to a blow molding machine as well as to a mandrel holder for use in container molding apparatus.

BACKGROUND

In stretch-blow molding machines for plastic bottles, pre-fabricated preforms are conveyed in a conveyor path through a heating station before they are processed in the blowing station. Each preform is already embodied with a mouth which at least essentially corresponds to the mouth of the finished bottle, and it is held in the conveyor path at this mouth by an inserted pre-forming wing mandrel. The pre-forming mandrel is fixed at the mandrel holder mounted in the conveyor path in an exchangeable manner. As many different container types, for example bottles, with various mouths have to be manufactured, the blow molding machine has to be retooled for a changeover to preforms having different mouths. That is to say that the pre-forming mandrel very precisely fits into the mouth and is therefore not suited for different mouth types. In a blow molding machine employed in practice, the coupling consists of a freely ending sleeve at the mandrel holder and a peg at the pre-forming mandrel insertable in the sleeve. In the sleeve, two diametrically opposed, obliquely rising guiding ways with a dead center cam area into which pins arranged at the peg engage are recessed. In addition, a spring is provided which non-positively supports the positive locking. To exchange a pre-forming mandrel, with the conveyor path being stopped, a hand or a tool acts on the pre-forming mandrel, pushes it upwards and then rotates it about its longitudinal axis until the pins exit from the guiding ways. Vice-versa, when a new pre-forming mandrel is inserted, the same is threaded up in the guiding ways with the pins, in the process axially pushed upwards and rotated until it is locked. As considerable thermal stress and vibrations act on the mandrel holder and the pre-forming mandrel during conveyance, the coupling must ensure a secure hold of the pre-forming mandrel and therefore generate a relatively high retention force which has to be overcome when it is exchanged. Handling is troublesome, takes quite a long time and requires considerable skills. As often several hundreds of mandrel holders are arranged in the conveyor path, exchange lasts inappropriately long.

SUMMARY OF THE DISCLOSURE

Aspects underlying the disclosure are to provide a blow molding machine of the type mentioned in the beginning as well as a mandrel holder for a pre-forming mandrel which are operator-friendly and permit extraordinarily short change times.

By the functional separation of the two aspects, on the one hand of reliably generating the high retention force for the pre-forming mandrel by the clamping mechanism, and on the other hand of actuating the releasing element for releasing the clamping mechanism as smooth-running as possible and in an ergonomically advantageous manner, the handling of the coupling is very operator-friendly and the coupling can be very quickly engaged and released, respectively. That is to say that, for releasing the clamping mechanism, the releasing element can be moved essentially independently of the retention force easily and over only a small stroke until the pre-forming mandrel can be removed or falls out automatically, while the clamping mechanism alone takes care of the high retention force when the releasing element is not being actuated.

Advantageously, the coupling of the mandrel holder is a ball joint lock which is constructively simple, fail-safe and easy to actuate, nevertheless generates the high retention force required for the pre-forming mandrel, and only the releasing element is moved relative to the mandrel holder to release the ball joint lock. No force has to be applied on the pre-forming mandrel. The action of the releasing element on the ball joint lock can be designed such that the same can be readily and quickly released despite the high retention force with relatively little releasing force and a small stroke. The ball joint lock has the further advantage of permitting the insertion of the pre-forming mandrel by simply fitting it in without having to use the releasing element for this operation, too. This does not exclude that a ball joint lock is still used which requires the actuation of the releasing element also for inserting the pre-forming mandrel.

Advantageously, the clamping mechanism and the releasing element are arranged in the mandrel holder in the blow molding machine. This results in a simple design of the pre-forming mandrel for the respective mouth type.

Particularly advantageously, the releasing element is moved from a passive position, in which the ball joint lock acts automatically, approximately in the axial direction of the mandrel holder relative to the mandrel holder and also relative to the fixed pre-forming mandrel, to a releasing position where the pre-forming mandrel can be easily removed. This moving direction cannot only be handled well manually, but it is also especially suited for mechanical action, for example by an automatic or semiautomatic mandrel change machine.

Advantageously, the clamping mechanism only locks in the separating direction of the pre-forming mandrel, while the pre-forming mandrel can be easily inserted and fixed in the clamping mechanism without actuation of the releasing element. The pre-forming mandrel is fixed exclusively by insertion and without any further manipulation.

In an advantageous embodiment, the releasing element comprises a handle projecting outwards between the mandrel holder and the pre-forming mandrel which can be acted manually or mechanically to adjust the releasing element to the releasing position. Despite the normally limited space conditions at the conveyor path of a blow molding machine, access is easily possible in this region.

In an alternative embodiment, the axial movement of the releasing element is effected by means of an auxiliary element which is, for example, arranged at the mandrel holder, and which is embodied, for example, as a lever or pushbutton actuated approximately transversely to the axial direction and diverting the transverse movement to the axial movement of the releasing element.

In an advantageous embodiment, the pre-forming mandrel can be fixed with a peg in a push-in seat of the clamping mechanism.

Advantageously, the clamping mechanism is a ball joint lock with at least one ball, preferably several balls distributed in the circumferential direction. Each ball is captivated in a passage of the mandrel holder, namely between a surface extending in the mandrel holder in the removing direction of the pre-forming mandrel obliquely with respect to the axis of the mandrel holder (ramp or conical surface) and the mandrel push-in seat of the mandrel holder open at one end for introducing the peg of the pre-forming mandrel.

For accommodating the ball such that it is easily movable and nevertheless captivated, the passage fixedly positioned in the mandrel holder is a bore narrowing from the outside to the inside, preferably a counterbore, in which the ball engages and through which it can be displaced with its circumference partially into the mandrel push-in seat to be able to act on the peg. The counterbore is designed with respect to the ball bend such that the ball also has a lateral and axial clearance therein when it acts on the peg. The retention force (in the sense of rotation and in the axial direction) is transmitted to the mandrel holder via the wall of the counterbore. The ball clearance zone in the mandrel holder permits the movements of each ball necessary for the function of the ball joint lock.

In an advantageous embodiment, the releasing element is a movable sleeve engaging from one end into the ball clearance zone which is preferably guided on the wall of the mandrel holder and is supported in the mandrel holder so as to be secure against being pulled out and directed to the ball.

In an advantageous embodiment, the sleeve extends from one end of the ball clearance zone beyond the respective ball. The sleeve contains an opening for the ball in which it can be displaced, whereby the sleeve is supported against being pulled out of the mandrel holder. Although the mandrel holder is normally mounted to be suspended, so that anyway gravity acts downwards on the sleeve and/or the ball, a spring can be preferably applied to the sleeve which spring acts on the sleeve in the direction towards the passive position. For the spring, a low pre-tensioning force is sufficient which can be easily overcome when the releasing element is actuated.

To facilitate assembly, an O-ring is advantageously positioned externally in the sleeve adjacent to the respective ball opening. The O-ring in a simple way prevents the balls from falling out during assembly or disassembly.

In a constructively simple embodiment, the handle is a ring flange projecting outwards at the exposed end of the sleeve. To possibly prevent the transmission of rotatory forces to the sleeve and the balls during the actuation at the handle, the ring flange can be rotating relative to the sleeve.

In one embodiment, the peg at the pre-forming mandrel is at least essentially cylindrical. The frictional force arising between the ball or the balls, respectively, and the outside circumference of the cylindrical peg is by far sufficient for securely holding the pre-forming mandrel.

However, in an advantageous embodiment, an indentation, preferably a shallow circumferential groove, can be provided in the peg circumference and in the ball application region to ensure that the pre-forming mandrel cannot abandon its locked operational position in an uncontrolled manner under operation-related vibrations and/or thermal influences.

By means of the releasing element, a convenient and quick handling during an exchange is possible already in case of manual actuation. To even further shorten and/or simplify the exchange time, according to an important idea of the disclosure, at the conveyor path at least one automatic or semiautomatic mandrel change machine actuating the releasing element or the handle thereof is arranged. This can be brought and/or docked to the conveyor path stationarily or laterally, or even move along in parallel to the conveyor direction to exchange the pre-forming mandrels one after the other or a complete group of pre-forming mandrels each at a time.

In an advantageous embodiment, the automatic or semiautomatic mandrel change machine comprises a drivable actuator (manually or by means of a pneumatic, motor-driven or other drive), and preferably a mandrel gripper which removes or inserts the respective pre-forming mandrel. A magazine for pre-forming mandrels should be allocated to the mandrel gripper, for example for pre-forming mandrels to be inserted or which have been removed, or for pre-forming mandrels to be inserted and for those which have been removed.

According to a further important feature, at least one automatic or semiautomatic change machine for the removal and at least one automatic or semiautomatic change machine for the insertion of the pre-forming mandrels can be provided. Then, several magazines for removed pre-forming mandrels and for pre-forming mandrels to be inserted can also be allocated.

As a matter of principle, the ball joint lock in the mandrel holder has the advantageous effect of very reliably generating a high retention force for the inserted pre-forming mandrel at relatively little efforts and costs in connection with an extraordinarily convenient releasing movement which can be carried out at very little expenditure of force and with a short stroke. By the separation of the retention function from the releasing function, both functions can be optimized, and especially the releasing function permits extraordinarily short changing times.

BRIEF DESCRIPTION OF THE DRAWINGS

With reference to the drawings, embodiments of the subject matter of the disclosure are illustrated. In the drawings.

DETAILED DESCRIPTION OF THE PREFERRED EMBODIMENT

Figure 1:
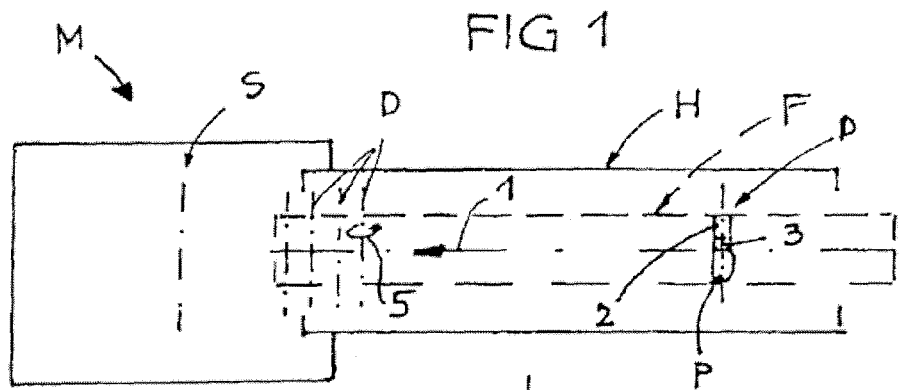
FIG. 1 schematically shows a container blow molding machine which is charged with preforms.

FIG. 1 schematically illustrates a blow molding machine M for containers, for example a stretch-blow molding machine for plastic bottles. A blowing station S with a non-depicted blow molding star is connected to a conveyor path F which at least in sections runs through a heating device H for preforms P to be heated or to be treated thermally. The conveyor path F in operation moves in the conveying direction 1 and contains a plurality of mandrel devices D placed close to each other, each consisting of a mandrel holder 2 transportable in the conveyor path F and mounted to be suspended in this case, and a pre-forming mandrel 3 attached thereto in an exchangeable manner, onto which one preform P each can be placed. The mandrel devices D are possibly rotated about their axes in the sense of rotation 5 in operation.

Figure 2:
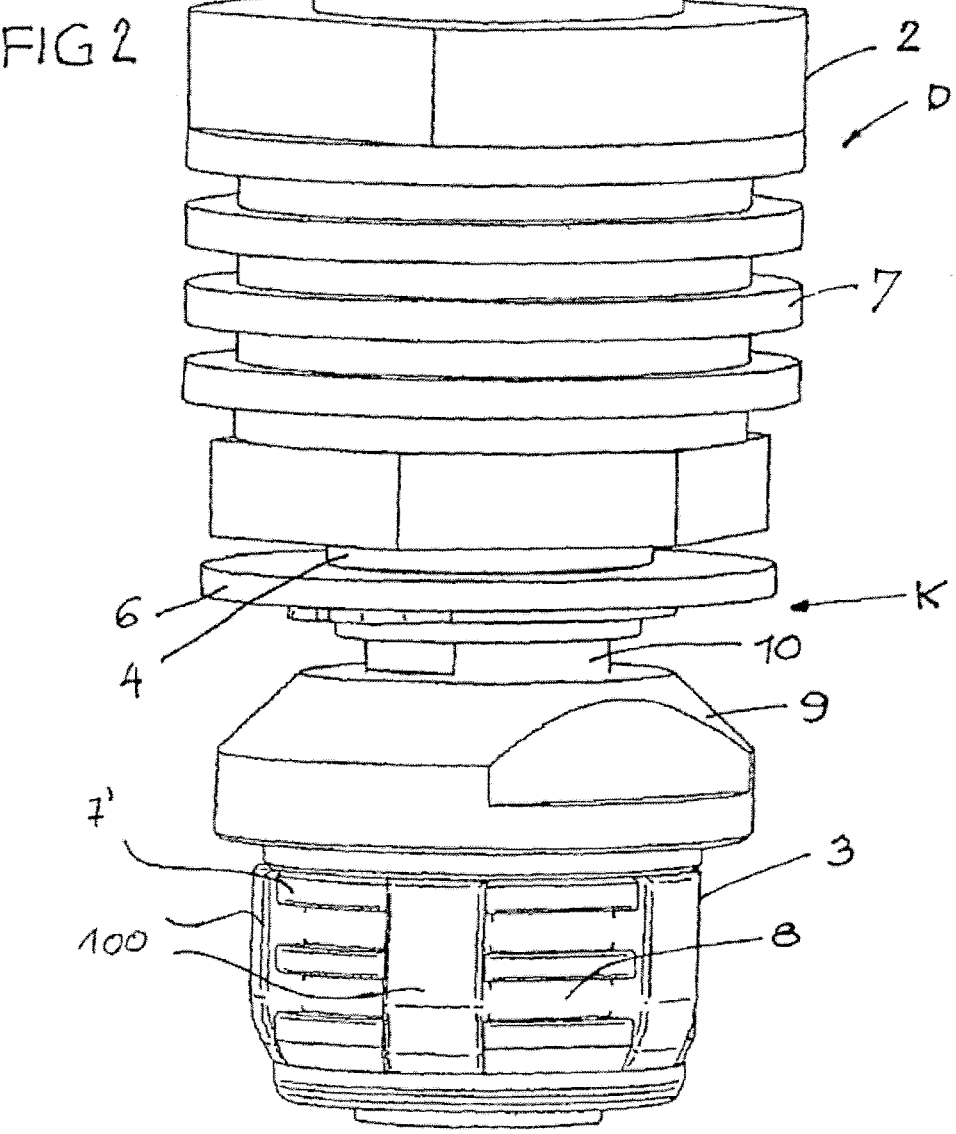
FIG. 2 shows a perspective view of a mandrel holder equipped with a pre-forming mandrel, for example for the blow molding machine of FIG. 1.
Figure 3:
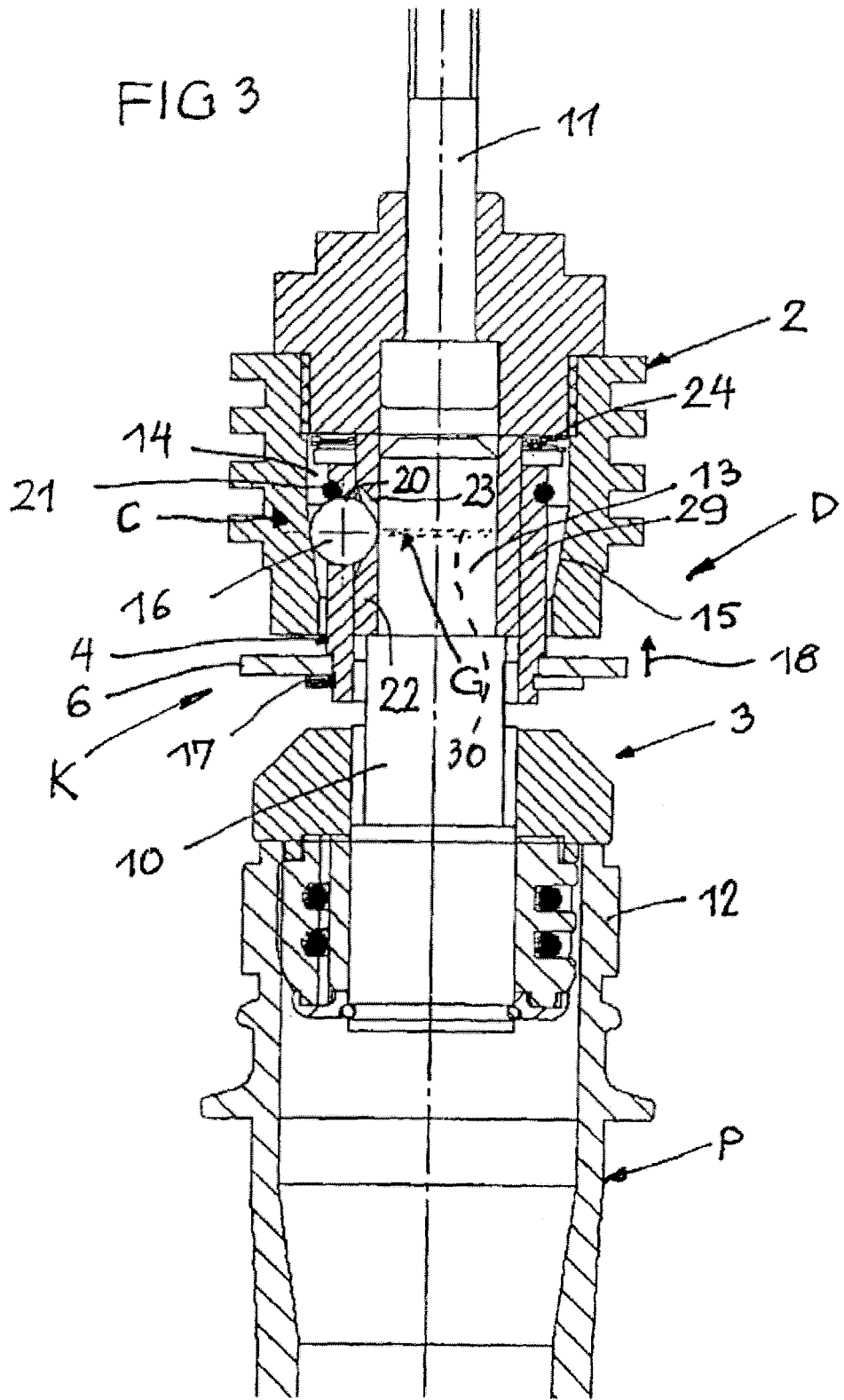
FIG. 3 shows a longitudinal section to FIG. 2 with an attached preform.

According to FIGS. 2 and 3, the pre-forming mandrel 3 is mounted at the mandrel holder 2 mounted via a shaft 11 in an exchangeable manner by means of a releasable coupling K to be able to exchange a pre-forming mandrel 3 for a preform type with a predetermined mouth concept for another pre-forming mandrel 3 for another preform type. The releasable coupling K is releasable by means of a releasing element 4 at which a handle 6 projecting outwards for mechanical or manual application is attached. Adjacent to a head portion 9, the pre-forming mandrel 3 has an upper peg 10 and at the lower end for example several O-rings 8 which expand at least one clamping jaw 100 for holding a preform P that has been put on. Cooling fins 7 can be formed at the mandrel holder 2. The lower part of the head portion can also be equipped with cooling fins 7'. In operation, these are located within the mouth of the preform, so that radiant heat can be taken up by the head portion and introduced into the preform during the heating process. The head portion 9 is equipped with clamping jaws 100 at its lower end which apply a retention force on the inner surface of the mouth of the preform to be held. The clamping jaws can be here e.g. several clamping jaws 100 perpendicularly attached in grooves, however they can also be one or several clamping jaws 100 attached in the circumferential direction.

According to FIG. 3, a ball joint lock G is the principal component of the releasable coupling K. The ball joint lock G and the releasing element 4 are arranged in the mandrel holder 2. In a non-depicted alternative, the ball joint lock G as well as the releasing element 4 could be accommodated in the respective pre-forming mandrel 3.

The preform P is fixed at the pre-forming mandrel 3 with its mouth 12. From the peg 10, a further peg 13 extends over a shoulder, which can be inserted in a push-in seat of the mandrel holder 2 and therein fixed by means of the ball joint lock G.

An annular ball clearance zone 14 is defined in the mandrel holder 2 which is limited outside by an obliquely or conically extending surface 15 and inside by a wall 22 of the mandrel holder 2. The surface 15 is inclined obliquely (in FIG. 3 downwards) inwards and serves as clamping surface for the ball joint lock G. The ball joint lock G comprises at least one ball 16 (or several balls 16 distributed in the circumferential direction) which acts on the peg 13 through a passage 23 in the wall 22. The passage 23 is for example designed as inwardly tapered counterbore which permits a certain axial clearance for the ball 16, is however inside smaller than the ball diameter. In the peg 13, an indentation indicated by a dotted line for engagement of the ball is possibly provided in the ball application region, for example a shallow circumferential groove 30.

The releasing element 4 is a sleeve 29 which is guided to be movable on the wall 22 with a slight sliding fit and here extends beyond the ball 16 upwards and exits at the bottom from the lower end of the ball clearance zone 14. In the sleeve 29, an opening 20 is designed approximately with the ball diameter in which the ball can be displaced inwards and outwards. At the upper side adjacent to the opening 20, an O-ring 21 facilitating the assembly of the ball joint lock G is placed in the sleeve 29 at the outside. A spring 24, for example an ondular, washer, acts with pretension on the sleeve 29 from above downwards. The handle 6 is an outwardly projecting ring flange in the shown embodiment which is rotatably mounted on the lower end of the sleeve 29 by means of a locking ring 17.

In a non-depicted alternative, the sleeve 29 could also only act on the ball 16 from the bottom and be secured in the mandrel holder 2 so that it cannot be pulled out in a different way.

In a further, non-depicted alternative, at least one diverting lever could be attached at the outside at the mandrel holder 2, which lever is movable by pressure or pulling transverse to the axis of the mandrel holder and acts on the releasing element 4 to axially adjust the same. This lever diverts the lateral actuation force to the axial actuation force of the releasing element 4.

In FIG. 3, the ball joint lock G is shown in its locked position. Each ball 16 rests on the surface 15 with pressure and simultaneously on the outer circumference of the peg 13 with pressure. In this manner, the pre-forming mandrel 3 is held down against being pulled off by each ball 16 being supported in the passage 23 and thus in the wall 22.

To release the ball joint lock G and remove the pre-forming mandrel 3, a force in the direction of the arrow 18 is exerted on the releasing element 4 upwards from the shown passive position, so that the ball 16 is moved upwards along the surface 15 and thereby abandons its action on the peg 13. The pre-forming mandrel 3 then either falls down automatically, or it is pulled out manually or by means of a non-depicted preform gripper.

For inserting a new pre-forming mandrel 3, the peg 13 only has to be shifted into the push-in seat, for example until the shoulder abuts between the peg 10 and the peg 13 at the wall 22, and this without actuating the releasing element 4, whereupon the ball joint lock G automatically takes the locking position, e.g. supported by the spring 24.

The releasing element 4 can be actuated manually or mechanically.

Figure 4:
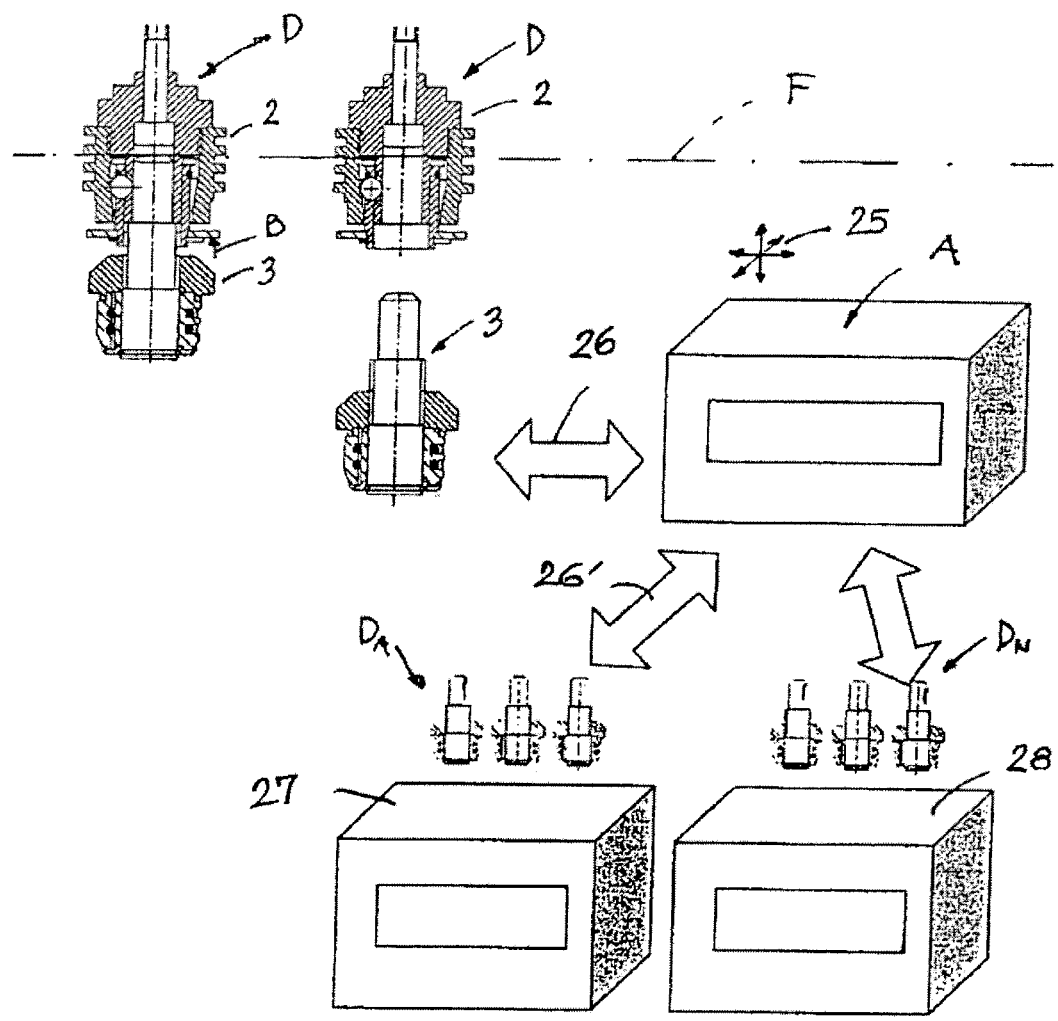
FIG. 4 shows a schematic representation of a semiautomatic or automatic pre-forming mandrel change system.

FIG. 4 illustrates a change system for pre-forming mandrels, where two mandrel devices D are shown of which the left one still contains the pre-forming mandrel 3 in the mandrel holder 2, and an actuator B is acting on the releasing element. In the mandrel device D on the right in FIG. 4, the pre-forming mandrel 3 is already removed from the mandrel holder 2 of the conveyor path F.

An automatic or semiautomatic change machine A can be provided for inserting or removing the respective pre-forming mandrel 3, the machine being either located stationarily at the conveyor path F, or it can be laterally moved and possibly docked to it, or it can even travel along with the conveyance device (direction arrows 25). The automatic machine A can comprise one or several mandrel grippers 26 and drivable actuators B to change one, or simultaneously several, pre-forming mandrels 3. The automatic machine A either comprises separate drives for the mandrel gripper or grippers 26, 26' and the actuators B, or it is partially also manually actuated to move the respective mandrel gripper 26, 26' and/or the respective actuator B during the change.

Advantageously, the automatic machine A comprises at least one mandrel gripper 26, 26' for removing pre-forming mandrels DA and putting them down in a magazine 27, and at least one mandrel gripper 26, 26' for picking up and inserting a new pre-forming mandrel DN each, e.g. from another magazine 28.

The automatic machine A can be designed for carrying out both change activities or only for carrying out one of the change activities. Advantageously, the automatic machine A is positioned at a site of the conveyor path where the conveyor path F is diverted and the mandrel holders 2 are thus somewhat further spaced apart than in the straight course of the conveyor path. In this region, good access to the releasing element 4 of each mandrel holder 2 is provided.

The mandrel device D according to FIGS. 2 and 3 can also be used for other machines, where an object is to be transported or positioned by means of a mandrel, and where different mandrels can be exchanged.

I claim:

1. Blow molding machine for containers, in particular bottles, comprising a conveyor path carrying mandrel holders, pre-forming mandrels attached at the mandrel holders by means of releasable couplings in an exchangeable manner, and each coupling having a mandrel clamping mechanism and a releasing element accessible from outside that can be adjusted at least relative to the mandrel holder for releasing the clamping mechanism, wherein the clamping mechanism is a ball joint lock with at least one ball and each at least one ball is arranged in a passage of the mandrel holder between a surface in the mandrel holder one of oblique or conical with respect to the axis of the mandrel holder in a pull-off direction of the pre-forming mandrel and the mandrel push-in seat that is open at one end; the passage being a bore that narrows from an outside to an inside in a wall of the mandrel holder limiting the mandrel push-in seat inside, and a ball clearance zone provided between the wall and the one of oblique or conical surface; and the releasing element being a movable sleeve that engages in the ball clearance zone from one end and is guided on the wall, the sleeve being supported in the mandrel holder such that it cannot be pulled out and is directed to the ball.

2. Blow molding machine according to claim 1, wherein the clamping mechanism only locks in the separating direction of the pre-forming mandrel, and the pre-forming mandrel can be inserted in the clamping mechanism without actuation of the releasing element.

3. Blow molding machine according to claim 1, wherein the releasing element comprises a handle projecting outwards between the mandrel holder and the pre-forming mandrel for one of manual or mechanical application.

4. Blow molding machine according to claim 3, and wherein at least one automatic or semiautomatic mandrel change machine actuating one of the releasing element or the handle is at the conveyor path which can be at least one of stationarily docked to the conveyor path, laterally docked to the conveyor path, laterally brought to the conveyor path, or moved in parallel to the conveyor direction.

5. Blow molding machine according to claim 4, wherein the automatic or semiautomatic mandrel change machine comprises a drivable actuator for the releasing element and one of a motively, pneumatically or manually actuated mandrel gripper, and that a magazine for pre-forming mandrels is allocated to the mandrel gripper (26).

6. Blow molding machine according to claim 5, wherein the mandrel gripper can be driven to remove a pre-forming mandrel from the mandrel holder and to pick up and insert it in the mandrel holder, and that a magazine for removed pre-forming mandrels and a magazine for pre-forming mandrels to be inserted are allocated to it.

7. Blow molding machine according to claim 4, wherein in the same or in at least one further automatic or semiautomatic mandrel change machine, a mandrel gripper driven to pick up and insert mandrels in mandrel holders is provided.

8. Blow molding machine according to claim 1, wherein the pre-forming mandrel can be fixed with a peg in a push-in seat of the clamping mechanism.

9. Blow molding machine according to claim 1, wherein the sleeve extends from one end of the ball clearance zone beyond the ball and comprises an opening for the ball in which the ball can be displaced along the one of oblique or conical surface during the movement of the sleeve, and that a spring acting on the sleeve in the direction towards the passive position is preferably applied on the sleeve.

10. Blow molding machine according to claim 9, wherein the handle is a ring flange projecting outwards at the outer end of the sleeve.

11. Blow molding machine according to claim 10, wherein the ring flange rotates relative to the sleeve.

12. Blow molding machine according to claim 1, and an O-ring is positioned outside adjacent to the ball opening in the sleeve.

13. Blow molding machine according to claim 1, wherein the releasing element can also be moved relative to the fixed mandrel.

14. Blow molding machine according to claim 1, wherein the at least one ball comprises several balls distributed in the circumferential direction.

15. Blow molding machine according to claim 1, wherein the bore is a counterbore.

16. Mandrel holder for a pre-forming mandrel for a blow molding machine with a releasable coupling for attaching and fixing one each of different pre-forming mandrels at the same mandrel holder in an exchangeable manner, wherein the coupling comprises a mandrel clamping mechanism with a ball joint lock and a releasing element accessible from outside that can be adjusted at least relative to the mandrel holder for releasing the ball joint lock, the releasing element being a sleeve including an opening permitting displacement of a ball of the ball joint lock, wherein the clamping mechanism only locks in a separating direction of the pre-forming mandrel, and the pre-forming mandrel can be inserted in the clamping mechanism without actuation of the releasing element.

* * * * *

UNITED STATES PATENT AND TRADEMARK OFFICE
CERTIFICATE OF CORRECTION

PATENT NO.       : 8,567,589 B2
APPLICATION NO. : 12/672554
DATED            : October 29, 2013
INVENTOR(S)      : Wolfgang Schonberger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Fifteenth Day of September, 2015

Michelle K. Lee
*Director of the United States Patent and Trademark Office*